United States Patent [19]

Huff et al.

[11] Patent Number: 4,508,684
[45] Date of Patent: Apr. 2, 1985

[54] PROTECTION OF ALUMINUM BASED STRUCTURES AGAINST HEAT TRANSFER CORROSION IN COOLING SYSTEMS

[75] Inventors: John Huff, Detroit; Ronald R. Wiggle, Dearborn, both of Mich.; Vladimir Hospadaruk, Clearwater, Fla.

[73] Assignee: Ford Motor Company, Dearborn, Mich.

[21] Appl. No.: 300,367

[22] Filed: Sep. 8, 1981

[51] Int. Cl.³ ............................................... C23F 11/00
[52] U.S. Cl. ......................................... 422/8; 422/18; 422/25; 422/DIG. 900; 252/68
[58] Field of Search ............. 422/8, 18, 25, DIG. 900; 252/68

[56] References Cited

U.S. PATENT DOCUMENTS

| | | | |
|---|---|---|---|
| 2,961,292 | 11/1960 | Pickett et al. | 422/18 X |
| 3,203,969 | 8/1965 | Pines et al. | 260/448.2 |
| 3,284,368 | 8/1966 | Hatch | 252/389 |
| 3,312,622 | 4/1967 | Pines et al. | 252/75 |
| 3,340,001 | 9/1967 | Thornhill et al. | |
| 3,960,576 | 6/1976 | Carter et al. | 252/181 X |

FOREIGN PATENT DOCUMENTS 149877 8/1981 German Democratic Rep. ... 422/18

*Primary Examiner*—Arthur D. Kellogg
*Attorney, Agent, or Firm*—Joseph W. Malleck; Olin B. Johnson

[57] ABSTRACT

A method is disclosed of protecting heated aluminum based metals subject to heat transfer through the metal to a circulating aqueous cooling solution in contact therewith. The initially constituted cooling solution contains an alkali metal silicate in an adjusted amount above 0.2 gram per liter. The solution while functioning in the cooling system is then exposed to an alkali metal silicate glass causing the glass to progressively dissolve and stabilize the silicate at a level of at least 0.1 gram per liter. The initially prepared solution may also contain ethylene or propylene glycol, alkali metal phosphates and tetraborates in a ratio greater than 4:1, and nitrate, mercaptobenzothiazole or tolyltriazole.

24 Claims, 5 Drawing Figures

PROTECTION OF ALUMINUM BASED STRUCTURES AGAINST HEAT TRANSFER CORROSION IN COOLING SYSTEMS

BACKGROUND OF THE INVENTION

Most cooling systems, particularly vehicle engine cooling systems, use water as the primary cooling medium because of its good heat transfer qualities, low cost and universal availability. It has two disadvantages which, however, are of particular interest to its use as a cooling medium for internal combustion engines: (a) it has a relatively high freezing point, and (b) a tendency to corrode metals used in the engine cooling system. To prevent damage to the metallic components of the system by frozen coolant, a freezing point depressant is added in the form of an antifreeze solution.

Modern antifreeze solutions are also formulated to contain corrosion inhibitors for the various metals used in a cooling system such as copper, brass, cast iron, steel, solder, aluminum and zinc. It is becoming more prevalent for some components of the cooling system now to be made of aluminum alloys. Corrosion of aluminum or aluminum alloys by heat transfer is of principal concern here; heat transfer corrosion is used to mean corrosion of a metal at the metal/solution interface, which results solely from heat being transferred through the metal and rejected to the solution. Heat transfer corrosion of aluminum alloys is particulary troublesome because such alloys usually operate at higher interface temperatures with the cooling fluid tending to promote heat transfer corrosion. A change in the chemistry of the cooling solution over long usage also increases heat transfer corrosion. Heat transfer corrosion can produce either actual perforation of a metal wall or, more frequently, the clogging of heat exchanger tubes with corrosion products.

Both organic and inorganic compounds have been used as corrosion inhibitors added to antifreeze solutions. Organic compounds have comprised mineral and vegetable oils, and their sulfonated products, phosphonates, amines, amides, triazoles, benzoates and mercaptans; complex organosilicon compounds such as silicones, silanes and siloxanes have also been used. Inorganic compounds have included silicates, borates, phosphates, nitrates and nitrites, molybdates, arsenites and tellurites. Most of these corrosion inhibitors are not effective in protecting aluminum based metals of a cooling system and therefore are ineffective in solving the problem of this invention. Those that have shown some degree of effectiveness in protecting aluminum include phosphates, nitrates and silicates. However, the prior art has viewed the corrosion problem as one which can be solved by a short-term solution which includes adding various corrosion inhibitors to the premixed solution. Such approach overlooks the change in the chemistry of the cooling solution that takes place over long-term use.

In the European and Japanese automobile industry, it has been prevalent to use antifreeze solutions having corrosion inhibitors comprised either of (a) benzoate/borate/nitrite aggregation, which has proved to be relatively weak in the protection of aluminum, or (b) the use of a nitrate in combination with triethanolamine phosphate. To eliminate the heat transfer corrosion with nitrates, the Europeans have added triethanolamine phosphate. Unfortunately, the amine inhibitor can be nitrosated to form nitrosamine; nitrosamines have been shown to be carcinogenic in laboratory animals and thus are avoided in the United States.

In the United States, alkali metal tetraborates and phosphates in combination with silicates have become prevalent ingredients in antifreeze solutions. Both borates and phosphates tend to cause unwanted heat transfer corrosion products with aluminum, particularly very hot surfaces of aluminum cylinder heads. Phosphates additionally suffer from a moderately fast depletion rate in use. Although silicates have been used in combination with tetraborates and phosphates, they have not proved entirely successful in preventing extended heat transfer corrosion because silicates exhibit an even faster depletion rate.

SUMMARY OF THE INVENTION

The invention is a method of protecting heated aluminum based metals subject to heat transfer through the metal to a circulating aqueous cooling solution in contact therewith. More particularly, the invention provides for protecting aluminum alloys used in engine cylinder heads against heat transfer corrosion over a long term.

The method comprises exposing the heated aluminum based metal to an initially constituted cooling solution comprised of an aqueous solution containing a substance effective to retard heat transfer corrosion, said substance consisting of an alkali metal silicate of the formula $M_2O.(SiO_2)_n$, where M is the alkali metal and n is 1.0 or greater, in a concentration of at least 0.2 gram per liter after adjustment for any initial precipitation of said silicate on the walls of the metal. The initially constituted solution is then continuously exposed, during operation of the cooling system, to an alkali metal silicate glass, causing the glass to progressively dissolve in an amount to stabilize the silicate concentration in solution at a level of at least 0.1 gram per liter in solution, thereby substantially inhibiting heat transfer corrosion.

It is preferable, in the initial preparation of the aqueous solution, to combine ethylene glycol or propylene glycol in an amount respectively exceeding 45% and 38% by volume of the solution, to combine the alkali metal silicate with an alkali metal phosphate, advantageously in an amount of 0.9-10 grams per liter (as $PO_4\equiv$), to combine an alkali metal nitrate in an amount of about 0.5-1.5 grams per liter (as $NO_3-$), to combine an alkali metal tetraborate in an amount of about 0.5-2.7 grams per liter (as $B_4O_7=$), and to combine mercaptobenzothiazole or tolyltriazole in an amount of about 1 gram per liter. The phosphate and tetraborate, when added together, are preferably in a ratio range of 4:1.

The preferred alkali metal silicate glass is comprised of fused $SiO_2$ and $Na_2O$ in a ratio of 1.5:1–4.0:1. Control of the $SiO_2/Na_2O$ ratio can ensure that the silicate concentration remaining in solution after 30,000 miles of automotive cooling system use will be at least 0.1 gram per liter and heat transfer corrosion will be limited to less than 1.0 milligrams/cm²/week.

To ensure that the glass dissolves sufficiently fast over its period of use, such as 30,000 miles of vehicular use, at least one of the following may be employed: (a) reducing the ratio of $SiO_2$ to $Na_2O$ in the fused glass, (b) increasing the surface contact area of the glass with the solution, advantageously by structuring the glass as balls, and (c) forming the glass with a chemical dissolution promoter such as pyrophosphate.

A further feature of this invention is an apparatus system that advantageously facilitates the timed release of the alkali metal silicate glass body into solution of the cooling system. The apparatus comprises a cooling system through which a fluid is circulated, including walls defining cooling channels having a heat absorption zone and a heat release zone, the walls of the heat absorption zone being comprised at least in part of aluminum, a conduit connecting the heat absorption zone and the heat release zone, and a coupling interposed in the conduit. The coupling has a chamber communicating with the interior of the conduit and is exposed to fluid passing therethrough. A solid glass silicate body is nested in the chamber for exposure to the moving fluid.

The coupling is preferably T-shaped and placed in the water hose connecting the engine block channels and the radiator of the vehicle, when the system is one for cooling an internal combustion engine. The stem of the T-shaped coupling forms an offset chamber in which a cylindrical body of glass can be placed and supported. The glass body can be inserted through the open end of the stem which is then closed by a pressurized cap. The glass body may additionally be shielded by a metallic foraminous sleeve to control the amount of contact between the solution and glass body. It is preferable that the glass body have a mass of about 40 grams and that the foraminous shield have openings totaling about 50% or more of the total surface area of the shield.

DETAILED DESCRIPTION

Antifreeze Solutions

Antifreeze solutions are added to a liquid, usually water, to lower its freezing point. Although a variety of materials have been used in the past, nearly all of the current market comprises only two types of base liquids, ethylene or propylene glycol, particularly for automotive use. In addition, the antifreeze solutions contain other chemical compounds as pH buffers and corrosion inhibitors to protect against corrosion and sludging of elements of the cooling system.

The use of aluminum cylinder heads is increasing in today's lightweight, more fuel efficient vehicles. Most conventional antifreeze or coolant formulations designed for cast iron engines are unsatisfactory for these aluminum components because of extensive heat transfer corrosion that takes place in the head. Heat transfer corrosion is used herein to mean corrosion of a metal at the metal/solution interface as a result solely of heat being transferred through the metal and rejected to the solution.

The principal objection to any heat transfer corrosion of the aluminum cylinder head casting is deposition of the resulting corrosion products on the interior surfaces of the radiator tubes to form an insulating film which will substantially reduce the radiator's heat transfer efficiency. Eventually, engine overheat and boil-over will result. A silicated solution has been discovered which prevents such heat transfer type of corrosion of aluminum alloy cylinder heads.

Heat transfer corrosion is not the only consideration in the design of a coolant corrosion inhibitor package. Water side corrosion can take place in aluminum radiators as a result of the electrochemical potential at regular and operating temperatures which causes pitting and crevice corrosion; water side erosion can also occur in aluminum water pumps. These problems are not as severe as the heat transfer type of corrosion and can be most easily cured by the addition of other chemical ingredients to the silicated antifreeze formulation.

Accordingly, it is a premise of this invention that the initially constituted solution added to the cooling system should contain a corrosion inhibitor which consists at least of an alkali metal silicate. Preferably, in addition, the solution may contain an alkali metal phosphate, borate, nitrate and either mercaptobenzothiazole or tolyltriazole.

Depletion Rate

Figure 2:
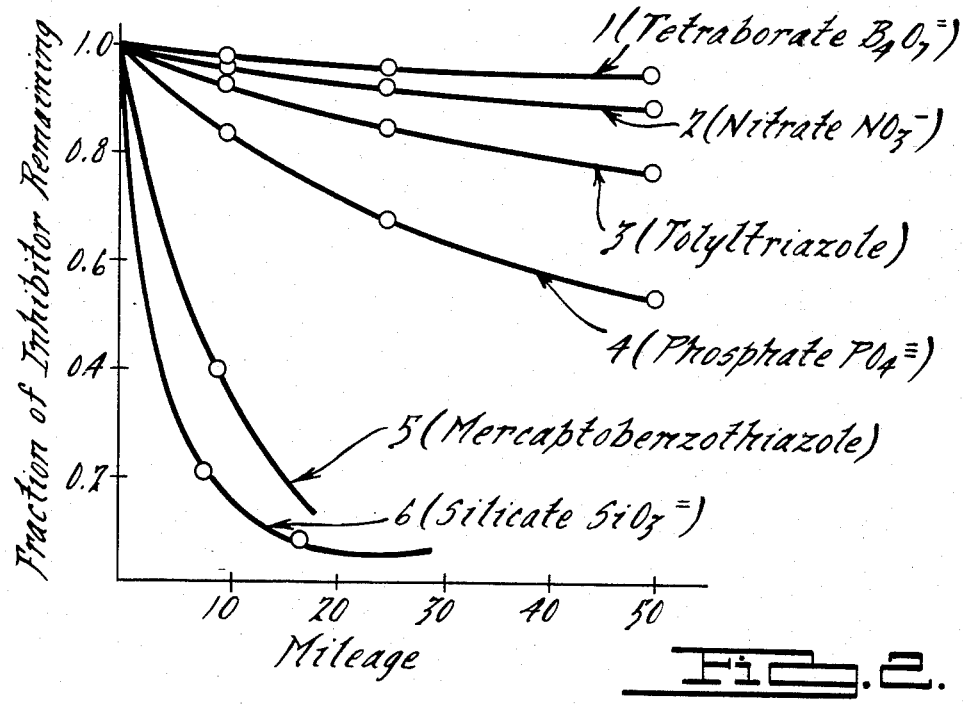
FIG. 2 is a graphical illustration plotting the typical fraction of corrosion inhibitor remaining in a cooling system medium as a function of the mileage (in thousands) obtained with the vehicle.

The depletion rate of the principal types of corrosion inhibitors is a measure of the relative need for the control and replenishment of that inhibitor in long life coolants. In FIG. 2, the typical depletion rates of pertinent inhibitors from service, fleet and simulated service circulation tests is graphically illustrated. A good depletion rate has heretofore been one which allows the fraction of the solution representing the inhibitor to remain above 0.5 when mileage has exceeded 30,000 miles/36 months.

As shown in FIG. 2, the tetraborate (curve 1), nitrate (curve 2), and tolyltriazole (curve 3) all present relatively low depletion rates and would not generally require replenishment when used in a cooling system having a typical life of 30,000 miles/36 months. However, these three ingredients are not effective in protecting aluminum against heat transfer type corrosion. Phosphate (curve 4) has a moderate depletion rate and does not provide sufficient or maximum type of heat transfer corrosion protection. As shown in curve 5, mercaptobenzothiazole has a rapid depletion rate and in addition provides little corrosion protection for aluminum surfaces. Silicate (curve 6) provides excellent protection against heat transfer type corrosion but unfortunately has the highest depletion rate of all the inhibitor additions to an antifreeze solution. Such depletion rate occurs too rapidly to provide satisfactory long-term protection in the cooling system by virtue of the original premix in the solution.

Figure 1:
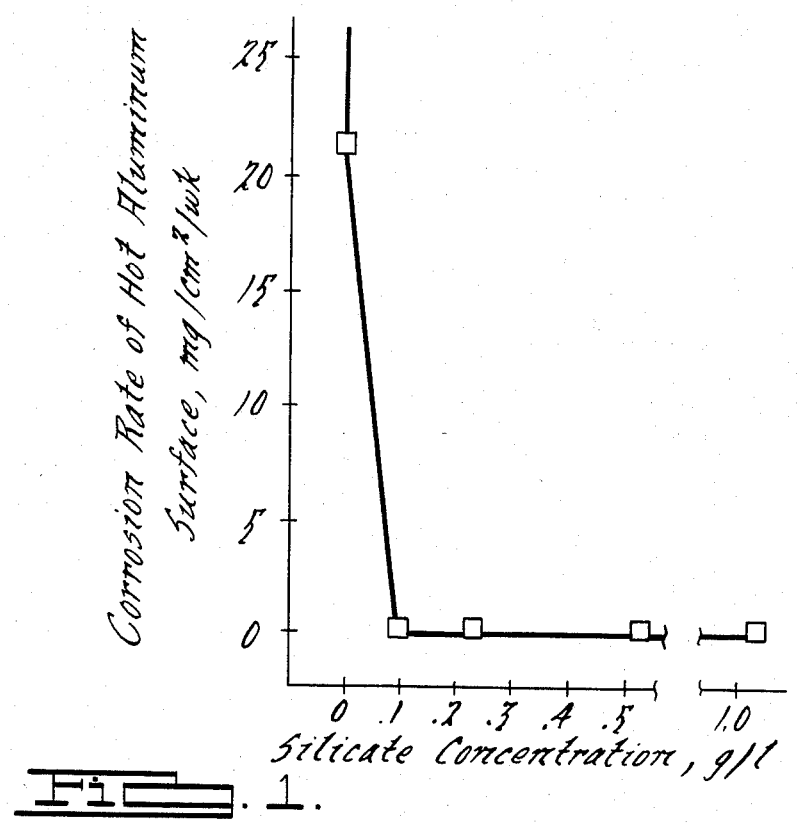
FIG. 1 is a graphical illustration of the rate of heat transfer corrosion of an ethylene glycol antifreeze formulation (using silicate) on an aluminum cylinder head alloy as a function of the silicate concentration. The formulation contains tetraborate, phosphate and tolyltriazole.

It has been discovered herein that a minimum silicate concentration of 0.1 gram per liter is necessary to prevent heat transfer type corrosion in an aluminum cylinder head. FiG. 1 shows how the corrosion rate dramatically increases at a certain "break" concentration of silicate for an antifreeze solution which is silicated (0.9 gram per liter $PO_4\equiv$, 0.9 gram per liter $B_4O_7\overline{=}$, and 0.2–0.54 gram per liter silicate). If 0.1 gram per liter silicate is not maintained in solution, heat transfer corrosion occurs and the corrosion products formed will deposit in the radiator passages and the engine will overheat.

Figure 3:
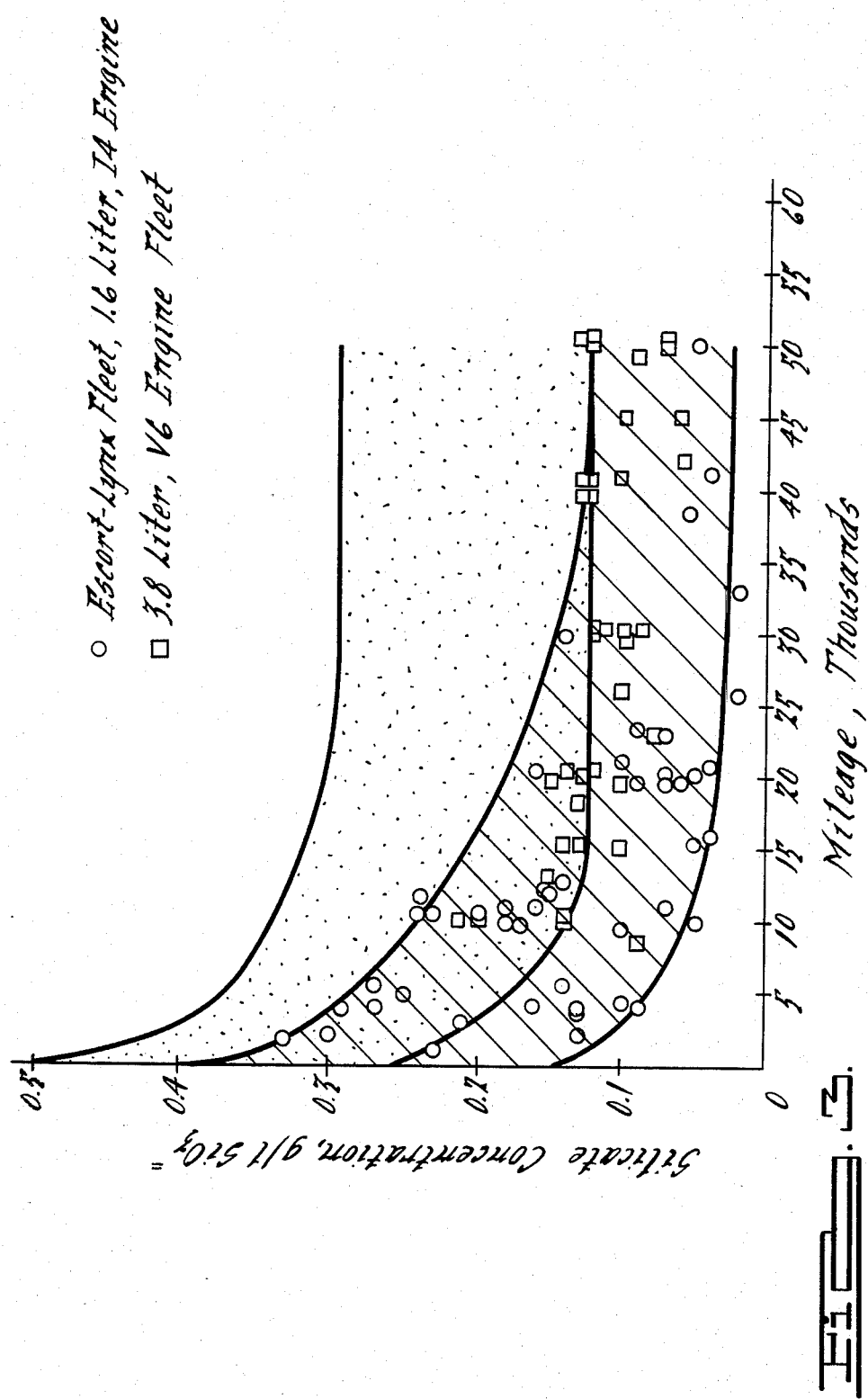
FIG. 3 is a graphical illustration of silicate concentration as a function of mileage (or usage) utilizing the method of this invention.

It has also been discovered that to maintain a silicate concentration continuously above this minimum level it is critical that a slowly soluble "timed release" silicate glass be exposed to the cooling solution to provide a constant, long-term residency of silicate ions. When a silicate glass is so employed, the concentration will remain above 0.1 gram per liter, as represented by the dotted zone in FIG. 3, for long life use (50,000 miles). The hatched zone represents the effect that occurs when the initially constituted solution has silicates precipitated on the walls of the engine head without adjustment for such loss. The silicate concentrations fall initially below 0.2 gram per liter in many cases and continuous exposure to a silicate glass will not raise the silicate content above 0.1 gram per liter, as shown by the hatched zone.

Silicate Glass

The silicate glass should consist of $SiO_2$ and $Na_2O$ fused together. The manufacture of such glass may be carried out as follows. A sodium silicate glass having an $SiO_2/Na_2O$ ratio between 1.5–4.0:1.0 can be made by mixing silica ($SiO_2$) and sodium carbonate ($Na_2CO_3$) in the proper proportions. When heated, the $Na_2CO_3$ decomposes to $Na_2O$ by the following reaction:

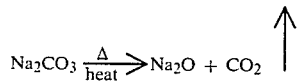

Other chemicals can be added to the mixture to increase or decrease the rate of dissolution of the glass as desired. For example, 10 weight percent or less of sodium pyrophosphate ($Na_4P_2O_7$) can be added to increase the solubility of the glass, while less than 1 weight percent of heavy metal oxides such as iron ($Fe_2O_3$) or calcium (CaO) can be added to decrease the solubility of the glass. After weighing, the materials are mechanically mixed (paint shaker) for at least three hours to obtain a uniform distribution of each constituent throughout the mixture. The powder is heated to 2500° F. in a platinum crucible for 25 minutes to allow the materials to interdiffuse and ensure that the glass will have a uniform composition. The melt is then poured into a cylindrical graphite mold of desired dimension. Immediately after casting, the mold is placed in a furnace preheated to 560° F., kept at that temperature overnight and then slow cooled to room temperature (76° F.). This heat treatment helps to remove some of the strain in the glass after casting. After the plug is removed from the mold, its surface is abraded with high purity glass powder in a sand blasting machine. This treatment removes the surface layer which might have a slightly different composition from the bulk glass due to a more rapid volatilization of the sodium oxide.

The dissolution rate of the silicate glass into the cooling medium is adjusted by varying the $SiO_2:Na_2O$ ratio in the manufacture of the glass. It has been found that the preferred range of $SiO_2:Na_2O$ ratio is between 1.5 and 4.0:1. It is difficult to make a stable glass with the $SiO_2:Na_2O$ ratio below 1.5:1, and the solubility of glasses with $SiO_2:Na_2O$ ratios greater than 4.0:1 is too low for actual vehicle coolant systems.

Preferred Method

A preferred method for protecting heated aluminum alloy cylinder heads in contact with an aqueous solution used as a circulating cooling medium in a cooling system in accordance with this invention, comprises:

(1) The heated aluminum alloy (typically 125°–140° C.) is exposed to an initially constituted cooling solution comprised of an aqueous solution having dissolved therein a first substance effective to retard heat transfer corrosion of said alloy, consisting of an alkali metal silicate of the formula $M_2O.(SiO_2)_n$, where M is the alkali metal and n is 0.1 or greater, in a concentration of at least 0.2 gram per liter after adjustment for any precipitation of the silicate on the walls of the aluminum alloy. Preferably, the alkali metal silicate is initially added in an amount of 0.5–1.2 grams per liter. the solution preferably also contains ethylene glycol in an amount which exceeds 45% by volume of the solution. Propylene glycol may alternatively be used in an amount that exceeds 38% by volume of the solution.

(2) The initially constituted solution is continuously exposed during operation of said cooling system to an alkali metal silicate glass causing the glass to progressively dissolve in an amount to stabilize the silicate concentration of said solution at a level of at least 0.1 gram per liter of the solution to substantially inhibit heat transfer corrosion of the alloy over the long term.

The silicate glass is preferably comprised of fused $SiO_2$ and $Na_2O$, the ratio of the $SiO_2/Na_2O$ being in the range of 1.5–4.0:1. Should the cylinder head be operated at unusually high temperatures for extended periods, the concentration of silicate supported by glass dissolution will be affected and reduced. To ensure that the concentration of silicate remains above above 0.1 gram per liter under these conditions, at least one of the following may be used to enhance more dissolution of glass: (a) the ratio of $SiO_2:Na_2O$ may be reduced in the designated range, (b) the surface contact area of the glass is increased such as by structuring the glass as spheres or balls, or (c) forming the glass with a chemical solution promoter consisting of pyrophosphate. The glass must be exposed to the solution in such a manner that it is continuously immersed in the engine coolant and may be preferably formed as a body which is cast from the molten ingredients.

Additional corrosion inhibitors may be added to the solution to further improve its performance which may include an alkali metal phosphate in an amount of 0.9–10 grams per liter (as $PO_4\equiv$) to facilitate the elimination of cavitation or erosion damage in an aluminum water pump associated with the cooling system, an alkali metal nitrate in the amount of about 0.5–1.5 grams per liter (as $NO_3^-$) to substantially reduce the problem of pitting corrosion of aluminum in such localities as the aluminum radiator and aluminum water pump, an alkali metal tetraborate in the amount of about 0.5–2.7 grams per liter (as $B_4O_7\overline{=}$) for general solution buffering, and either mercaptobenzothiazole or tolyltriazole in the amount of about 0.5–1.5 grams per liter for corrosion protection of the copper and brass components. A combination of these inhibitor ingredients will meet all the tests of heat transfer corrosion, electrochemical pitting corrosion, and cavitation erosion tests which are typically applied to automotive cooling systems.

Such a combination corrosion package has exceeded the minimum specification of Ford Motor Company for the heat transfer test which requires less than 1.0 mg/cm$^2$/week of heat transfer corrosion, has exceeded the Ford specification for galvanostatic pitting which requires a pitting potential equal to or more positive than −400 millivolts when measured against a saturated calomel electrode, and has exceeded the simulated service circulation test which requires a minimum rating of 6 for pitting, crevice and erosion attack of an aluminum radiator after 50,000 simulated miles/4 months.

EXAMPLES

To substantiate the principles of this invention, two types of tests were used: (a) a simulated 10,000 mile corrosion test program wherein heated aluminum alloy specimens were exposed to a pressurized cooling fluid in a fixed cell for seven days, and (b) actual vehicle engine use with an aluminum alloy head, for up to 50,000 miles.

In the seven day simulation tests, cleaned and polished flat plates of two types of aluminum alloys (AA 355 and AA 319) were placed on a heating bar which maintained the specimen at 135° C. A fluid cell was clamped over the specimen plate into which cooling mixtures were introduced. The aqueous solution mixtures were prepared from distilled water with chloride ion concentration of 100 ppm, commercial grade ethylene and propylene glycol, and reagent grade chemicals. The glycol and water were mixed on a 45% volume glycol basis. Certain inorganic corrosion inhibitors were added in amounts set out as follows:

|  | Concentration, grams per liter | | | |
| --- | --- | --- | --- | --- |
|  | $B_4O_7=$ [1] | $PO_4=$ [2] | $SiO_3=$ [3] | pH |
| Solution #1 | 0.9 | — | — | 8.5 |
| Solution #2 | 0.9 | 4.5 | — | 8.5 |
| Solution #3 | 0.9 | 4.5 | 0.5 | 10.0 |

[1] $B_4O_7=$ as $Na_2B_4O_7.10H_2O$ (sodium tetraborate)
[2] $PO_4=$ as $Na_2HPO_4.12H_2O$ (sodium phosphate, dibasic)
[3] $SiO_3=$ as $Na_2SiO_3.9H_2O$ (sodium meta-silicate)
TT (tolyltriazole)

The pH was adjusted to an amount set out in the table by use of sodium hydroxide. The mixtures all contained 1 gram per liter tolyltriazole as a brass/copper inhibitor; it was preferred over mercaptobenzothiazole because of its greater stability to heat and light.

After seven days, the specimens were removed from the tests cell and measured as to weight loss due to corrosion. It was found that the corrosion rate increased as the metal surface temperature increased up to 140° C. at which point boiling would take place to reduce the corrosion rate. It was also found that the chloride concentration, tolyltriazole content, aluminum alloy composition, oxygen content, and nitrate content had little effect on the heat transfer corrosion rate. Three factors were found to reduce the corrosion rate: (a) the presence of a necessary long-term concentration of silicate, (b) a minimum volume content of glycol, and (c) a desirable ratio between phosphates and borates when present.

First, with respect to the need for a long-term concentration of silicate, FIG. 1 plots the data from these tests for a solution mixture containing 0.9 gram per liter tetraborate, 0.9 gram per liter phosphate, 0.2–0.54 gram per liter silicate, and about 1 gram per liter tolyltriazole. The presence of silicate above 0.1 gram per liter, with low phosphate (0.9 g/l), provided an exceptionally stable surface film on the specimen and had a dramatic effect in essentially preventing heat transfer corrosion.

When both phosphate and tetraborate are present, it was found that the concentration ratio of phosphate/borate will influence the amount of long-term silicate concentration that must be present. It was found that a ratio range of 4:1 phosphate:tetraborate is desirable.

50,000 mile actual automobile fleet tests were also undertaken. The antifreeze solution contained greater than 45% ethylene glycol, corrosion inhibitors consisting of 2.16 grams per liter alkali metal phosphate, 0.90 gram per liter alkali metal tetraborate, 0.23 gram per liter tolyltriazole, 0.54 gram per liter alkali metal silicate, and an antifoaming agent consisting of non-ionic surfactant polyols in amounts of about 0.05% by weight. When the coolant solution was added to a newly manufactured vehicle without previous operation, the silicate concentration in solution was depleted by silicate precipitation on the walls of the cylinder head during the first 10,000 miles of operation (see cross-hatched zone of FIG. 3) generally below 0.2 gram per liter and the long-term silicate concentration generally fell below 0.1 gram per liter without exposure to a silicate glass. However, when the solution was adjusted or compensated for such precipitation to have an initially constituted concentration always above 0.2 gram per liter (see dotted zone in FIG. 3), and the solution was continuously exposed to an alkali metal silicate glass, the long-term silicate concentrate always remained above 0.1 gram per liter. The phosphate/borate ratio was less than desired (2.40), but the long-term heat transfer corrosion rate was significantly reduced.

Preferred Apparatus

Figure 4:
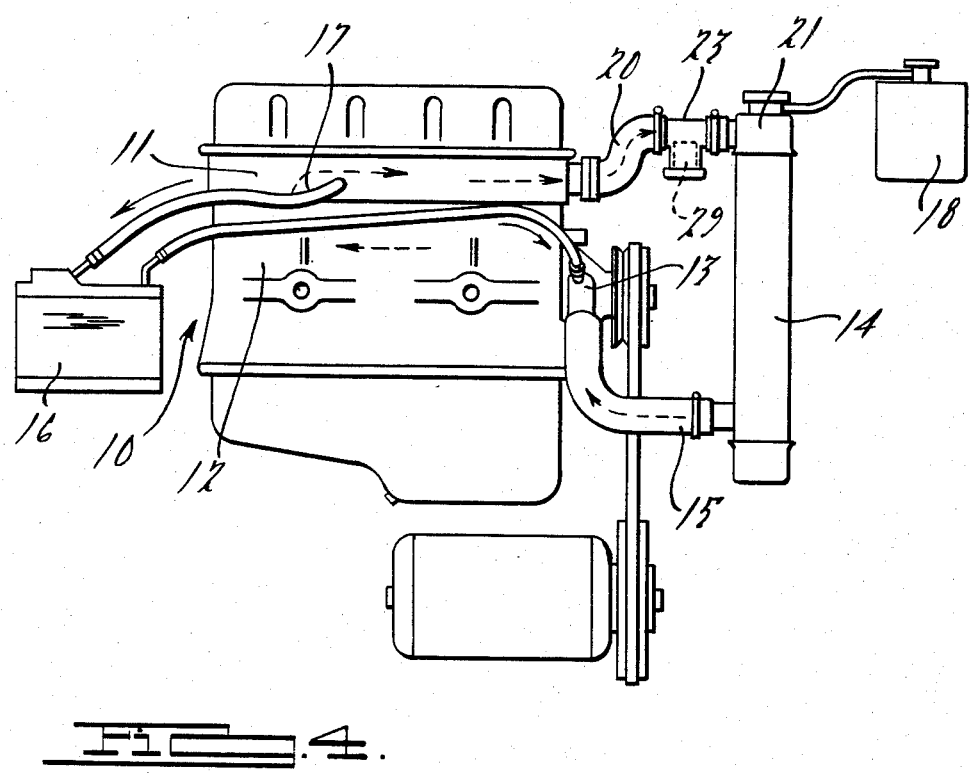
FIG. 4 is a schematic elevational view of an internal combustion engine employing apparatus to carry out the method of cooling of this invention.
Figure 5:
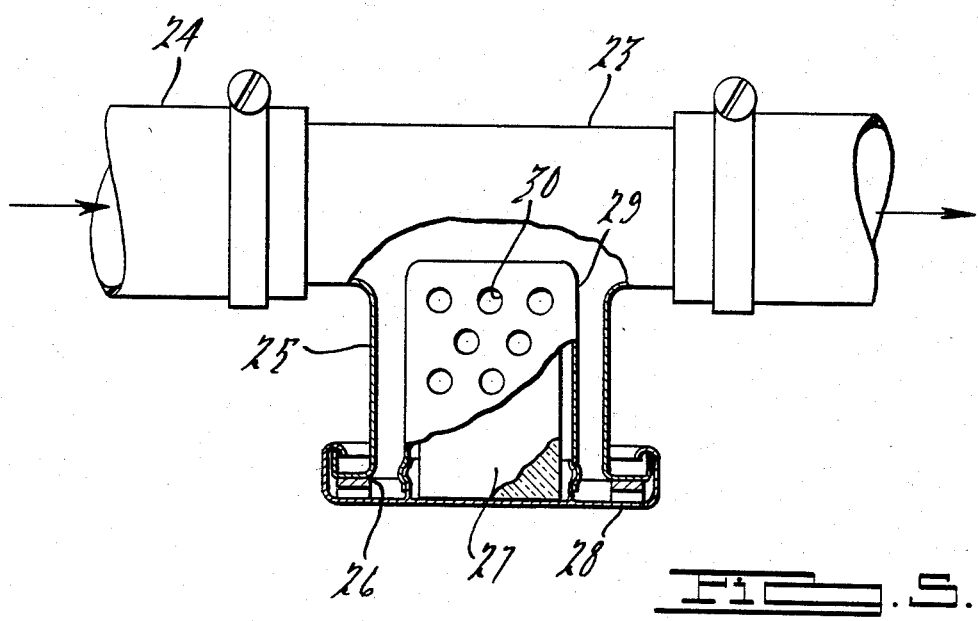
FIG. 5 is an enlarged fragmentary view of a portion of the cooling system of FIG. 3 illustrating the silicate glass coupling.

A preferred apparatus which will effectively facilitate the use of the silicate glass composition for the method of this invention is shown in FIGS. 4 and 5. The cooling system comprises an engine housing 10 which is comprised in part preferably of an aluminum cylinder head 11 and a cast iron or aluminum cylinder block 12, each containing intercommunicating internal water channels defined by walls which together are typically referred to as a water jacket. A water/ethylene glycol coolant solution is pumped by a water pump 13, typically comprised of a steel impeller and aluminum or cast iron housing. The water pump 13 positively moves the coolant solution through the cylinder block and aluminum head in the direction that is shown by the arrows. The solution picks up heat as a result of being exposed to engine walls containing the combustion process. The solution is sent to a radiator 14 which is typically comprised of aluminum or brass passages, relatively fine in nature, typically on the order of ⅛" by 1¼". The channels in the block and head typically comprise a heat absorption zone for the cooling fluid and The channels in the radiator comprise a heat release zone. The cooled liquid, having passed through the aluminum radiator which is exposed to outside cooling air, is then recirculated at 15 to the engine housing. If the heating cycle is employed, the hotter fluid at 17 is sent directly to a heater core 16 in the passenger compartment of the vehicle where heat is extracted. The lowered temperature cooling fluid is then sent immediately to the inlet of the water pump. A coolant overflow bottle 18 may be employed to either retain excess coolant which is expelled or to maintain a completely full radiator.

The solid silicate glass of this invention should not be disposed in such recovery system or overflow bottle because the coolant would be infrequently and inconsistently cycled between the radiator and overflow bottle. Accordingly, the preferred location for exposure of the solid silicate glass to the cooling medium is as shown in the conduit 20 communicating the aluminum head with the top of the inlet manifold 21 for the radiator. To this end, a T-shaped coupling 23 (FIG. 5) is interposed in the rubberized water hose 24 or water channel. The stem 25 (forming an offset chamber) of the T-shaped coupling has an opening 26 through which a solid cylinder body 27 of such glass may be inserted and supported therein by a pressurized cap 28, sealing the open end of the stem. The cylindrical silicate glass body 27 is nested in a foraminous metallic capsule or sleeve 29 which may be comprised of brass or aluminum and controls and shields the contact between the cooling solution and the solid silicate glass body. In order to optimize the dissolution rate of the silicate glass, the glass cylinder body should have a dimension generally of 1" diameter × 1½" length, and the number of openings 30 in the sleeve should have a diameter within the range of 3/16" to ¼", and be spaced approximately ⅛" to 3/16" apart. These preferred dimensions are based on the premise that the cooling medium is typically at a temperature of 190° F. (87.78° C.) with the engine head at a temperature of 125°–140° C., and is circulating with a fluid flow rate of about 12–24 gal/min. The preferred location for exposure of the glass body provides for easy introduction and recharge of another body without the necessity to drain the cooling system.

We claim:

1. A method of protecting heated aluminum based metals subject to heat transfer through the metal to a circulating aqueous cooling solution in contact therewith, comprising:
  (a) exposing said heated metal to an initially constituted cooling solution comprised of an aqueous solution having dissolved therein a first substance effective to retard heat transfer corrosion of said metal, said first substance consisting of alkali metal silicate of the formula $M_2O \cdot (SiO_2)_n$, where M is the alkali metal and n is 1.0 or greater in a concentration of at least 0.2 gram per liter after adjustment for any precipitation of said silicate on the walls of said metal;
  (b) continuously or interruptedly exposing said initially constituted solution to an alkali metal silicate glass causing said glass to progressively dissolve in an amount to continuously stabilize the silicate concentration in solution at a level of at least 0.1 gram per liter of solution to and thereby to continuously substantially inhibit heat transfer corrosion of said metal.

2. The method as in claim 1, in which said solution contains a second substance effective to lower the freezing point of said solution, consisting of ethylene glycol exceeding 45% by volume of said solution or propylene glycol exceeding 38% by volume of said solution.

3. The method as in claims 1 and 2, in which said metal is structured as an internal combustion engine cylinder head with said solution being conveyed by channels defined therein.

4. The method as in claim 1, in which said first substance additionally consists of an alkali metal tetraborate in an amount of 0.5–2.7 grams per liter effective to stabilize the pH of said solution with varying temperature conditions.

5. The method as in claim 1, in which said first substance additionally consists of an alkali metal phosphate in an amount of 0.9–10 grams per liter effective to inhibit other metal corrosion.

6. The method as in claim 1, in which said first substance additionally consists of an alkali metal phosphate and alkali metal tetraborate in a ratio greater than 4:1, said glass being continuously exposed to said solution for progressive dissolution in an amount to stabilize said silicate concentration at a level of at least 0.10 gram per liter.

7. The method as in claim 1, in which said aluminum based metal is heated to the temperature range of 125°–140° C.

8. The method as in claim 1, in which said glass is comprised of $SiO_2$ and $Na_2O$ in a ratio of about 1.5–4.0:1.

9. The method as in claim 1, in which said first substance additionally consists of an alkali metal phosphate in an amount of about 10 grams per liter (as $PO_4\equiv$) and an alkali metal tetraborate in an amount of about 1 gram per liter (as $B_4O_7\equiv$), said glass being continuously exposed to said solution for progressive dissolution in an amount to stabilize said silicate concentration at a level of at least 0.10 gram per liter to substantially inhibit heat transfer corrosion of said metal.

10. A method of protecting heated aluminum based metals subject to heat transfer through the metal to a circulation aqueous cooling solution in contact therewith, comprising:
  (a) exposing said heated metal to an initially constituted cooling solution comprised of an aqueous solution having dissolved therein a first substance effective to retard heat transfer corrosion of said metal, said first substance consisting of alkali metal silicate of the formula $M_2O \cdot (SiO_2)_n$, where M is the alkali metal and n is 1.0 or greater, in a concentration of at least 0.2 gram per liter after adjustment for any precipitation of said silicate on the walls of said metal;
  (b) continuously or interruptedly exposing said initially constituted solution to an alkali metal silicate glass comprised of $SiO_2$ and $Na_2O$, causing said glass to progressively dissolve in an amount to continuously stabilize the silicate concentration in solution at a level of at least 0.1 gram per liter of solution and thereby to continuously substantially inhibit heat transfer corrosion of said metal, said progressive dissolution of glass being controllably increased to maintain said minimum concentration level by using at least one of the following: reducing the ratio of $SiO_2$ to $Na_2O$ in said glass, increasing the surface contact area of said glass by structuring said glass of sintered balls, and forming said glass with a chemical dissolution promoter consisting of pyrophosphate.

11. A method of protecting an aluminum alloy cylinder head in contact with an aqueous solution used as a cooling medium in a cooling system for an automobile, comprising:
  (a) dissolving in said aqueous solution at least 0.2 gram per liter of an alkali metal silicate after adjustment for initial precipitation of silicate on the walls of said head, said silicate having the formula $M_2O \cdot (SiO_2)_n$, where M is the alkali metal and n is 1.0 or greater, and dissolving ethylene glycol in an amount which exceeds 45% by volume of said solution;

(b) continuously exposing said solution during operation of said cooling system to a metal silicate glass causing the silicate concentration of said solution to be continuously stabilized at a level which is at least 0.1 gram per liter of solution.

12. The method as in claim 11, in which said glass consists of $SiO_2$ and $Na_2O$ in a ratio effective to ensure said silicate remains in solution after 30,000 miles of automotive cooling system use at said stabilized level.

13. The method as in claim 12, in which heat transfer type corrosion of said aluminum alloy cylinder head does not exceed 1.0 $mg/cm^2$/week after 30,000 miles of use of said system.

14. The method as in claim 11, in which said metal silicate glass is comprised of fused $SiO_2$ and $Na_2O$.

15. The method as in claim 14, in which the ratio of the $SiO_2/Na_2O$ is in the range of 1.5–4.0:1.

16. The method as in claim 11, in which in step (a) a phosphate in an amount of about 0.9–10 grams per liter (as $PO_4^{\equiv}$) is additionally dissolved in said water/ethylene glycol solution.

17. The method as in claim 11, in which in step (a) a borate in the amount of 0.5–2.7 grams per liter (as $B_4O_7^{=}$) is additionally dissolved in said water/ethylene glycol solution.

18. The method as in claims 11, 14, 15, 16 and 17, in which in step (a) a nitrate in the amount of about 0.5–1.5 grams per liter (as $NO_3^-$) is additionally dissolved in said solution.

19. An apparatus for a cooling system through which a fluid is positively circulated, comprising:

(a) walls defining cooling channels having a heat absorption zone and a heat release zone, said walls being comprised at least in part of aluminum;

(b) a conduit interconnecting said heat absorption and heat release zones;

(c) a coupling interposed in said conduit, said coupling having a chamber communicating with the interior of said conduit and exposed to the fluid passing therethrough; and (d) a solid glass silicate body nested in said chamber for exposure to the moving cooling fluid.

20. The apparatus as in claim 19, in which said coupling has an offset chamber from the conduit.

21. The apparatus as in claim 19, in which said coupling is T-shaped with the stem of said T defining said chamber.

22. The apparatus as in claim 19, in which said glass body is shielded by a metallic foraminous sleeve.

23. The apparatus as in claim 21, in which said T-shaped coupling has an opening at the end of said offset chamber, said coupling having a pressure cap closing said opening after permitting the insertion of said solid silicate cylinder glass body therein.

24. The apparatus as in claim 19, in which the solid silicate glass is formed as a cylinder having a mass of about 40 grams and said foraminous shield having openings totaling an area of about 50% or more of the total surface area of said shield.

* * * * *